United States Patent
Wong et al.

(10) Patent No.: US 6,509,657 B1
(45) Date of Patent: Jan. 21, 2003

(54) BATTERY BACKUP UNIT SYSTEM AND INTERFACE

(75) Inventors: Hong W. Wong, Portland, OR (US); Manoj Agnihotri, Lake Oswego, OR (US); Kerry B. Vanderkamp, Hillsboro, OR (US); Paul J. Harriman, Dupont, WA (US); Jesus A. Martinez, Portland, OR (US); Sivakumar Sathappan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/513,477

(22) Filed: Feb. 25, 2000

(51) Int. Cl.[7] .................................................. H02J 3/14
(52) U.S. Cl. .............................. 307/66; 307/64; 307/86
(58) Field of Search .............................. 307/66, 23, 19, 307/29, 85, 65, 82; 364/948.5, 948.9, 64, 86; 363/65; 320/106, 125; 323/284, 224

(56) References Cited

U.S. PATENT DOCUMENTS 5,532,524 A * 7/1996 Townsley et al. .............. 307/64

* cited by examiner

*Primary Examiner*—Rajnikant B. Patel
(74) *Attorney, Agent, or Firm*—Fish & Richardson P.C.

(57) ABSTRACT

A battery backup unit can be used to supply backup power to a computer. The battery backup unit includes a charge circuit that is connected to the computer's power supply unit. The charge circuit is also connected to a battery pack that includes a battery. The charge circuit converts an input high DC voltage signal supplied by the power supply unit to a charging signal. The charging signal can be used to charge the battery in the battery pack. The battery backup unit also includes a discharge circuit that is connected to the power supply unit and the battery pack. The discharge circuit converts a battery signal received from the battery pack to an output high DC voltage signal. The output high DC voltage signal can be fed into the power supply unit in order to drive the power supply unit if there is an indication that the AC power input to the power supply unit is inadequate to drive the computer. The battery backup can include a controller to control the operation of the battery back up and a comparator for determining if the input high DC voltage signal supplied by the power supply unit is below a reference voltage. The battery backup unit can be connected to the motherboard of the computer in order to communicate with the motherboard. The battery backup unit and the motherboard can communicate using a System Management Bus or programmed input output. Changes in the status of the power supply unit, battery backup unit and battery pack can be communicated to the motherboard in order to notify the computer's operating system of the changes.

27 Claims, 5 Drawing Sheets

BATTERY BACKUP UNIT SYSTEM AND INTERFACE

BACKGROUND

This disclosure relates to power supply systems for computers, and more particularly to battery backup systems.

Computers that are plugged into an AC power outlet to supply power to the computer typically include a power supply unit that converts input AC power to DC power. The DC power produced by the power supply is used to drive the various components of the computer. For example, the ATX power supply described in the ATX Specification published by Intel Corporation, February 1997, is used to supply power to certain computers.

When adequate AC power is not supplied to the power supply unit, the operation of the computer may cease. This, in turn, may lead to data loss and/or damage to components of the computer.

Adequate power may not be supplied to the power supply, for example, due to a power interruption or brown out condition. An uninterruptible power supply ("UPS") may be attached to the computer in order to supply AC power to the power supply unit in the event AC power is not available from the AC power outlet. A conventional UPS unit is typically configured as a standalone unit that must be installed and maintained separately from the computer with which it is used. A conventional UPS unit typically includes a battery for providing power to the computer in the event of a power interruption or brown out condition. Such a conventional UPS unit typically includes power conversion circuitry to convert the DC power provided by the battery to the AC power input to the computer's power supply unit.

UPS units also typically include some mechanism for sending a message to the computer indicating that a power interruption or brown out condition has occurred. Such a message can be sent using a network interface card, serial port, or universal serial bus ("USB") port that connects the UPS unit to a computer and/or a computer network. The connected computer can be configured to initiate a controlled shutdown in response to receiving such a message.

DESCRIPTION OF DRAWINGS

Like reference symbols in the various drawings indicate like elements.

DETAILED DESCRIPTION

Figure 1:
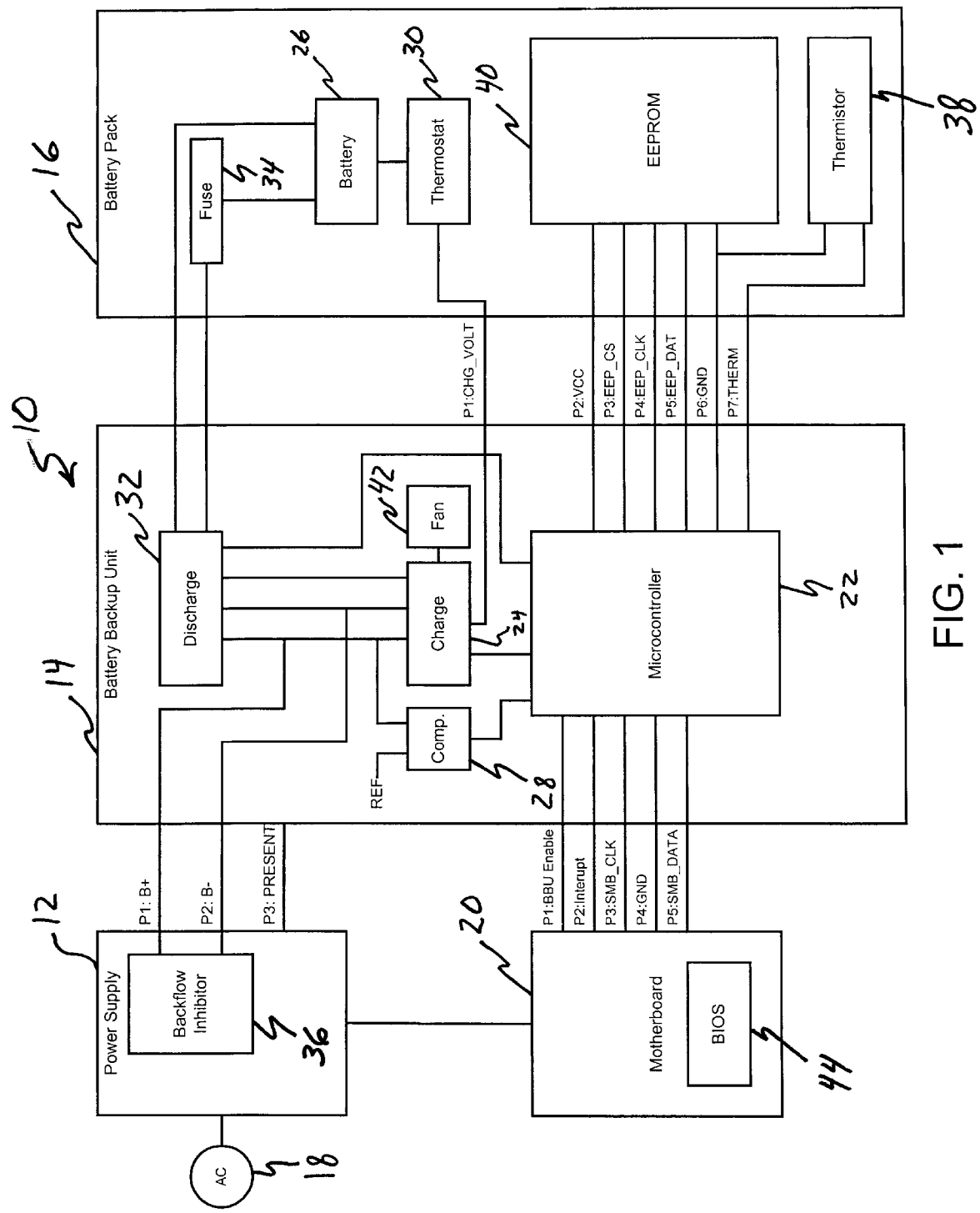
FIG. 1 is a block diagram of a computer having a battery backup unit and a battery pack.

FIG. 1 is a block diagram of a computer 10 having a power supply unit 12, a battery backup unit 14, and a battery pack 16. The power supply unit 12 receives AC main power from an AC power outlet 18. The received AC main power is rectified by the power supply unit 12 to produce an internal high DC voltage signal. The high DC voltage signal is then converted to produce an output DC power level that is used to power components on a motherboard 20. A suitable power supply unit 12 is an ATX power supply unit, as modified as described below.

The battery backup unit 14 provides backup battery power to the power supply unit 12 in the event that there is a loss of power from the AC power outlet 18. The battery backup unit 14 includes a microcontroller 22 that controls the operation of the battery backup unit 14. Instructions operable to cause the microcontroller 22 to control the operation of the battery backup unit can be stored in memory; for example, in internal RAM or ROM memory included in the microcontroller 22. A suitable microcontroller 22 is the ST72251 microcontroller, available from STMicroelectronics.

The high DC voltage signal from the power supply unit 12 (referred to here as the "input high DC voltage signal") is input (via lines B+ and B−) to a comparator 28 which compares the input high DC voltage signal to a reference voltage (REF). If the input high DC voltage signal is below the reference voltage, an output of the comparator 28 is asserted. The output of the comparator 28 is supplied to the microcontroller 22. The microcontroller 22 uses the output of the comparator 28 to determine whether to supply backup power to the power supply unit 12. For example, when an ATX power supply unit is used, the high DC voltage signal may be in the range of 300 Volts to 380 Volts when AC power is supplied by an AC power outlet. A suitable reference voltage for such an embodiment may be 180 Volts.

If the output of the comparator 28 indicates that adequate AC power is being supplied by the AC power outlet 18, the microcontroller 22 causes a charge circuit 24 to charge a battery 26 included in the battery pack 16. The charge circuit 24 includes a conventional voltage regulator (not shown) for converting the high DC voltage signal to produce a lower DC charge signal (CHG_VLT) suitable for charging the battery 26. If the microcontroller 22 indicates that the battery 26 should be charged, the charge current flows through a thermostat 30 to the battery 26. The thermostat 30 monitors the temperature of the battery 26 and will open (and stop the current flow to the battery 26) in an over temperature condition. A suitable battery 26 that can be used with an ATX power supply may include nine ENERGIZER® 1.2 Volt nickel metal hydride, "C" sized cells, which are commercially available from the Eveready Battery Company.

The battery backup unit 14 may also include a fan 42 connected to the charge circuit 24. The fan 42 is used to cool the battery backup unit 14 and the battery pack 16.

If the output of the comparator 28 indicates that the input high DC voltage signal is below the reference voltage, the microcontroller 22 causes a discharge circuit 32 to discharge the battery 26 and provide backup power to the power supply unit 12. The discharge circuit 32 includes a DC-to-DC voltage converter (not shown) that boosts the discharge signal produced by the battery 26 (via a fuse 34) to a level suitable to drive the power supply unit 12. This signal produced by the discharge circuit 32 is referred to here as the "output high DC voltage signal." For example, in order to drive an ATX power supply unit using the 9 cell battery described above, the discharge circuit 32 may boost the 10.2 Volt signal from the battery to a 200 Volt output signal.

The output high DC voltage signal produced by the discharge circuit 32 is supplied to the power supply unit 12 on the same lines (B+ and B−) that are used to supply the input high DC voltage from the power supply unit 12 to the battery backup unit 14. The output high DC voltage signal is fed to a bulk capacitor (not shown) of the power supply unit 12 in order to drive the input stage of the power supply 12. In this manner, the battery backup unit 14 provides backup power to the power supply unit 12 without having to first convert the DC power output by the battery 26 to an AC power (which would then need to be converted back to a high voltage DC signal by the power supply unit 12). In other words, the battery backup unit 12 can reduce the number of stages of power conversion required to provide backup power to the power supply unit 12.

A backflow inhibitor circuit 36 can prevent the output high DC voltage signal from backflowing into the AC power outlet 18. For example in an ATX power supply unit, the backflow inhibitor circuit 36 can include the power supply unit's bridge rectifier and a triac included in the power supply unit's auto-ranging circuit.

The microcontroller 22 is also connected to the motherboard 20 so that the microcontroller 22 and the motherboard 20 can communicate with each other. In one embodiment, the battery backup unit 14 can be configured to support the "Smart Battery Interface" as specified in the Smart Battery Data Specification, version 1.1 published by SBS-Implementers Forum, December 1998. In such an embodiment, as shown in FIG. 1, the microcontroller 22 is connected to a component (not shown in FIG. 1) of the motherboard 20 using a System Management Bus ("SMBus"). The SMBus is described in System Management Bus (SMBus) Specification, Version 1.1, published by the SMBus Specification Working Group, December 1998.

The microcontroller 22 and the motherboard 20 communicate using a battery-backup-unit-to-SMBus ("BBU-to-SMBus") interface. The BBU-to-SMBus interface includes SMBUS_CLOCK and SMBUS_DATA lines, which function as specified in the SMBus Specification. The BBU-to-SMBus interface also includes a conventional GROUND line. In addition, the BBU-to-SMBus interface includes an INTERRUPT/SMBUS_ALERT line. The INTERRUPT/SMBUS_ALERT line can be implemented as an open-collector or open-drain INTERRUPT signal that is asserted by the battery backup unit 14 in order to indicate to the motherboard 20 that some event relating to the battery 26 has occurred. For example, the microcontroller 22 can assert such an interrupt when the status of one or more of the following parameters or conditions change: the output voltage of the charge circuit 24, the output current of the charge circuit 24, the temperature of the battery 26, the output voltage of the battery 26, the presence of the battery 26 in the computer 10, or the existence of a power failure or low battery condition. Such an interrupt also can be asserted upon the occurrence of other events.

Alternatively, the INTERRUPT/SMBUS_ALERT line can be implemented as a TTL compatible, open-source or open-drain SMBUS_ALERT signal that functions as an interrupt line for devices that want to trade their ability to master for a pin, as described in the SMBus Specification.

The BBU-to-SMBus interface also includes a BBU_ENABLE line. The BBU_ENABLE line is a TTL compatible, open-collector signal from the motherboard 20 to the microcontroller 22. When the BBU_ENABLE line is asserted, it enables the battery backup unit 14 to provide power to the power supply unit 12 if and when a power interruption or brown out condition is detected. The BBU_ENABLE line can be used to prevent the battery backup unit 14 from providing power to the power supply unit 12. For example, the BBU-ENABLE line can be used to prevent the battery backup unit 14 from providing power to the power supply unit 12 after recovery from a power outage when the power from the AC power outlet 18 is restored.

In another embodiment, the battery backup unit 14 can be configured to support a "programmed I/O" interface with the motherboard 20. In such an embodiment, the microcontroller 22 is connected to the programmed I/O pins of a chip installed on the motherboard 20 that supports programmed I/O. One example of such a chip is an INTEL® 82371AB chip. In such an embodiment, the microcontroller 22 and the motherboard 20 communicate using a battery-backup-unit-to-programmed-I/O ("BBU-to-PIO") interface. In one embodiment of the BBU-to-PIO interface (referred to here as a "three-line BBU-to-PIO interface"), the interface includes a BBU_ACTIVE line, which is a signal that is provided from the motherboard 20 to the battery backup unit 14 to enable the battery backup unit 14 to provide battery power to the power supply unit 12 when there is a power interruption or brown out condition. The three-line BBU-to-PIO interface also includes an AC/DC_LINE_GOOD line, which is a signal that is provided from the battery backup unit 14 to the motherboard 20 to indicate that a power interruption or brown out condition has occurred and that the motherboard 20 should perform recovery procedures. The three-line BBU-to-PIO interface also includes a conventional GROUND line.

In another embodiment of the BBU-to-PIO interface (referred to here as a "five-line BBU-to-PIO interface"), the interface includes the same BBU_ACTIVE, AC/DC_LINE_GOOD, and GROUND lines as the three-line BBU-to-PIO interface and also includes a BATTERY_LOW line that indicates whether the battery 26 is fully charged or low. The five-line BBU-to-PIO interface also includes a BBU_READY line that indicates whether the battery backup unit 14 detects the presence of a battery 26 in the battery pack 16. All the lines of the BBU-to-PIO interface are TTL compatible, open source or open drain signals.

Figure 2:
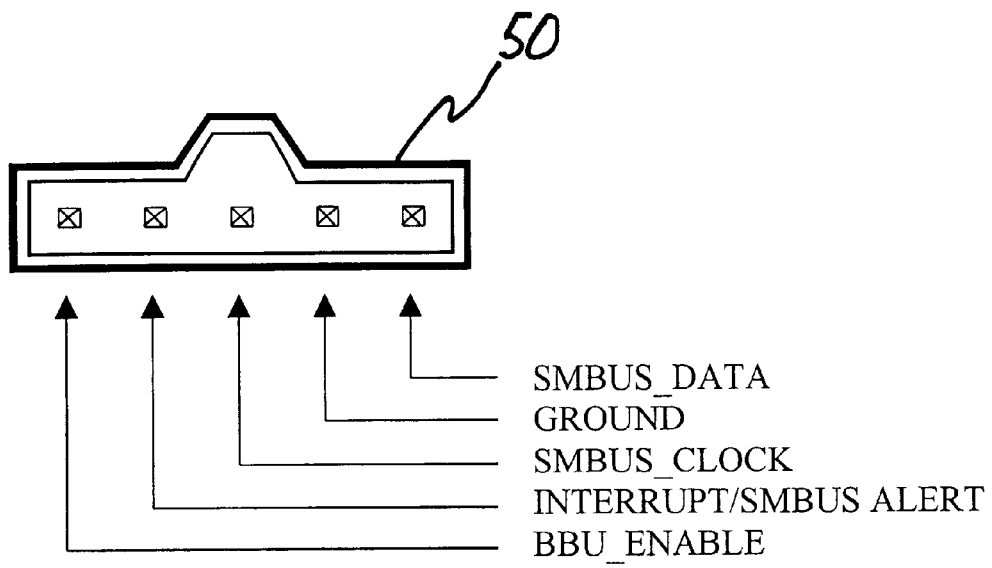
FIGS. 2–4 are schematic diagrams of connectors that can be used to connect a microcontroller to a matching socket on a motherboard.
Figure 3:
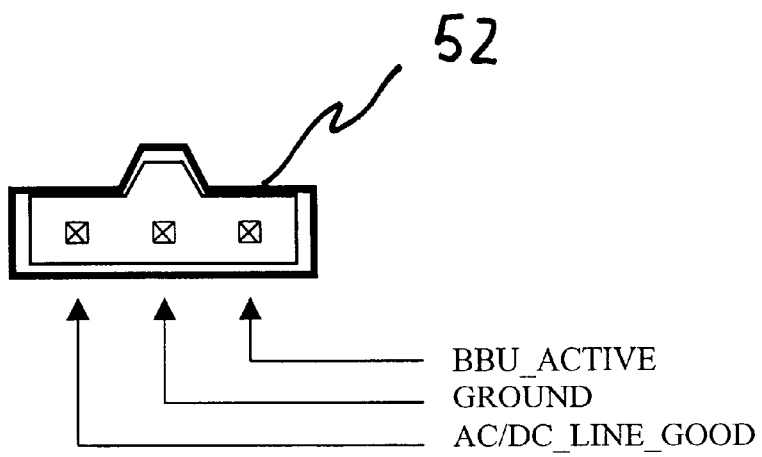
Figure 4:
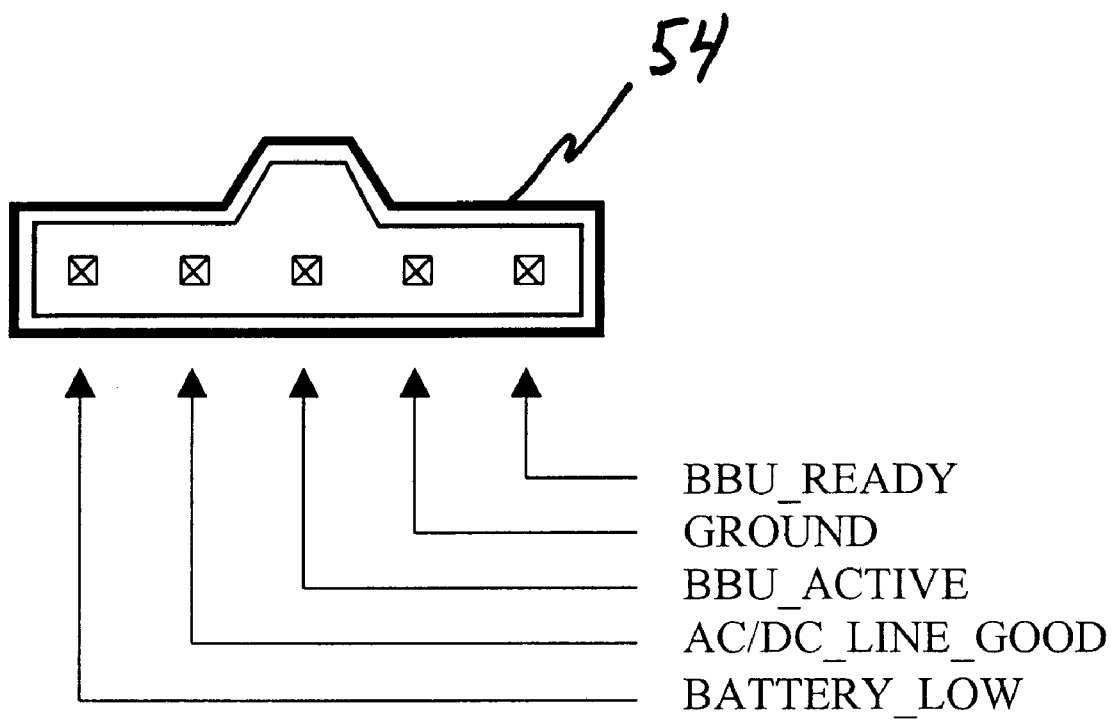

FIGS. 2–4 are schematic diagrams of connectors 50, 52 and 54 that can be used to connect the microcontroller 22 to a matching socket on the motherboard 20. Connector 50, shown in FIG. 2, is an example of a connector that can be used to connect the microcontroller 22 to the motherboard 20 using a BBU-to-SMBus interface. Connector 52, shown in FIG. 3, is an example of a connector that can be used to connect the microcontroller 22 to the motherboard 20 using a three-line BBU-to-PIO interface. Connector 54, shown in FIG. 4, is an example of a connector that can be used to connect the microcontroller 22 to the motherboard 20 using a five-line BBU-to-PIO interface. The connector 52 can be implemented using a 0.1 inch pitch C-grid III crimp connector housing, which is commercially available as MOLEX part 90156-0143. A matching socket that can be mounted on the motherboard 20 to receive such a connector 52 is a 0.1 inch pitch C-grid III shrouded header, which is commercially available as MOLEX part 90136-1X03. The connectors 50 and 54 can be implemented using a 0.1 inch pitch C-grid III crimp connector housing, which is commercially available as MOLEX part 90156-0145. A matching socket that can be mounted on the motherboard 20 to receive connector 50 or 54 is a 0.1 inch pitch C-grid III shrouded header, which is commercially available as MOLEX part 90136-1X05.

The battery pack 16 (shown in FIG. 1) also includes a thermistor 38 and an electrically erasable programmable readonly memory ("EEPROM") 40. The thermistor 38 is connected to the microcontroller 22 and is used to monitor the temperature of the battery 26. The microcontroller 22 is connected to, and communicates with, the EEPROM 40 using an I2C-based interface including chip select and serial clock and data signals (EEP_CS, EEP_CLK, and EEP_

DATA, respectively). The microcontroller 22 and EEPROM 40 are programmed and configured to emulate a hot-swappable, "Smart Battery" as specified in the Smart Battery Data Specification. The microcontroller 22 monitors and generates various present, calculated, and predicted information about the battery 26, including charging cycle count, device chemistry, device manufacture, capacity, and serial number. This information is stored in the EEPROM 40. The microcontroller 22 can also read the information stored in the EEPROM 40, for example, in order to supply the information to a device on the motherboard 20.

The power supply unit 12, the battery backup unit 14, and the battery pack 16 can be partitioned in a number of different ways. For example, the power supply unit 12, the battery pack 14 and the battery pack 16 can be configured as separate units as shown in FIG. 1. Such a battery pack 16 can be implemented as a self-contained, field-replaceable unit. Alternatively, the power supply unit 12, the battery backup unit 14 and the battery pack 16 can be integrated into a single unit or the battery backup unit 14 and battery pack 16 can be integrated into a single unit. Moreover, the battery pack 16 can be implemented using a conventional Smart Battery. Also, the battery pack 16 can be implemented using a "dumb" battery (that is, a battery that is not capable of storing information about itself).

Figure 5:
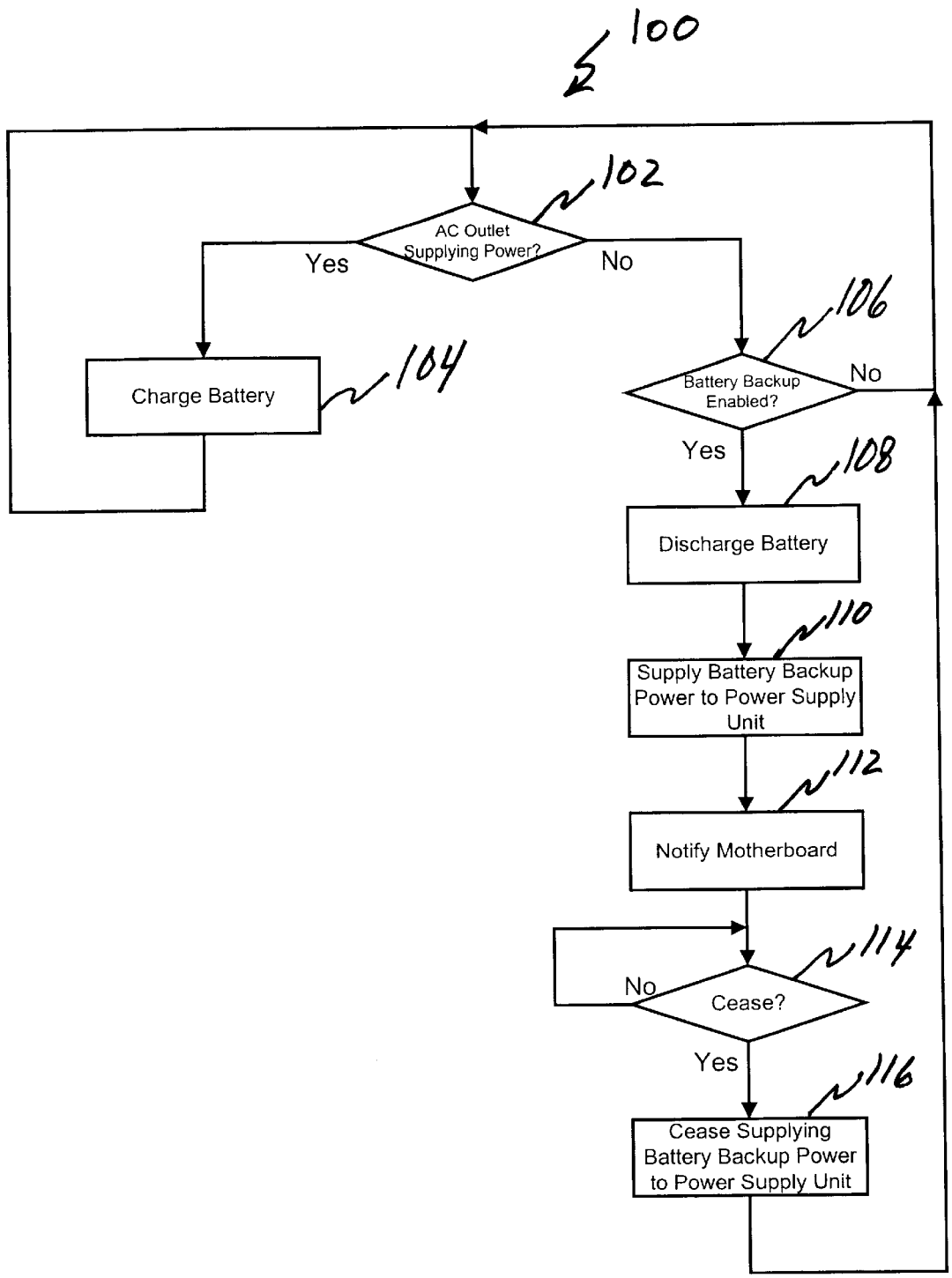
FIG. 5 is a flow diagram of a method of supplying backup power to a power supply unit.

FIG. 5 is a flow diagram of a method 100 of supplying backup power to a power supply unit 12. The battery backup unit 14 detects whether the AC power outlet 18 is supplying adequate power to the power supply unit 12 (102). If adequate power is being supplied to the power supply unit 12, then the battery backup unit 14 charges the battery 26 using the signal supplied by the charge circuit 24, if needed (104). If the battery backup unit 14 determines that adequate power is not being supplied to the power supply unit 12 (for example, due to a power interruption or brown out condition), the battery backup 14 checks if battery backup has been enabled (106). If battery backup has been enabled (for example, using a power management interface, such as the Advanced Configuration and Power Interface ("ACPI") implemented in the MICROSOFT® WINDOWS 98® operating system), then the battery backup unit 14 discharges the battery 26 (108) and supplies backup power from the battery 26 to the power supply unit 12 (110). Also, the battery backup unit 14 can be configured to indicate to the motherboard 20 that the battery backup unit 14 is supplying power to the power supply unit 12 (112). The battery backup unit 14 ceases supplying backup power to the power supply unit 12 when instructed to stop by the motherboard 20 (114, 116).

Figure 6:
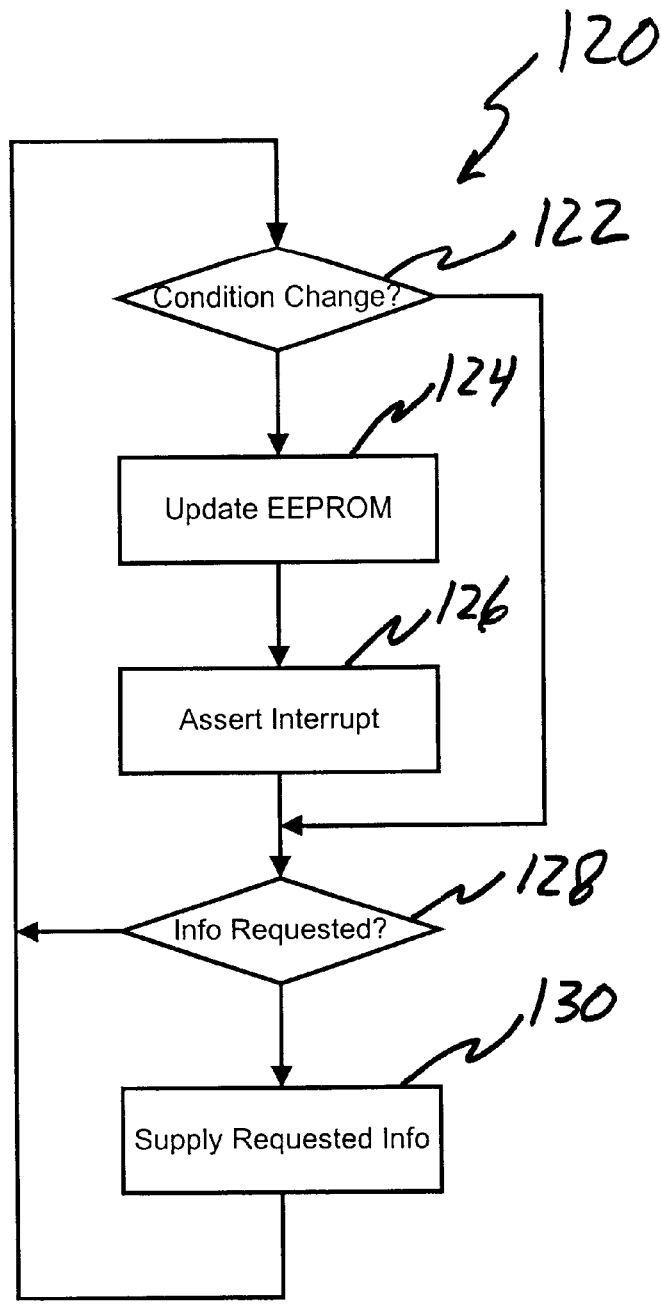
FIG. 6 is a flow diagram of a method of communicating power-related information to a motherboard.

FIG. 6 is flow diagram of a method 120 of communicating power-related information to the motherboard 20. The battery backup unit 14 can be configured to detect various changes in the status of the power supply unit 12, the battery pack 16, and/or the battery backup unit 14 itself (122). Such changes can include, for example, the insertion or removal of the battery pack 16 or battery 26, overheating of the battery 26, or an indication that there has been a loss of AC power. When such a change is detected, the microcontroller 22 can be configured to update any information stored in the EEPROM 40 (or smart battery, if one is used) related to that change (124) and/or assert an interrupt on the motherboard 20 (126). Then, the battery backup unit 14 supplies status information to the motherboard 20 if and when requested by the motherboard 20 (128, 130).

In one embodiment of the methods 100 and 120, the battery backup unit 14 asserts an interrupt using the INTERRUPT/SMBUS_ALERT line of the BBU-to-SMBus interface. An interrupt handler routine included in a basic input output system ("BIOS") 44 on the motherboard 20 detects the interrupt and determines that the battery backup unit 14 is the source of the interrupt. The BIOS interrupt handler routine then sets a general purpose ("GPO") bit in a chip (for example, a 82371AB chip) installed on the motherboard 20 that communicates with the operating system. Setting the GPO bit alerts the operating system that a battery backup unit condition has occurred. For example, the MICROSOFT® WINDOWS 98® operating system includes a Windows Management Instrumentation ("WMI") event provider that polls the GPO bit through a driver routine. When the GPO bit is set, the WMI event provider requests the status of the battery backup unit 14 and generates an appropriate event if warranted by the status of the battery backup unit 14. For example, if the battery backup unit 14 indicates a loss of AC power, the WMI event provider can be configured to generate a predefined event.

A power management application running on the operating system can be configured to handle such an event. The power management application can be configured to monitor BBU-related events and allow the user to specify responses to such events. For example, the user can configure the power management application to display an alert message on a display monitor attached to the computer 10 when the power management application detects an event indicating the loss of AC power. The displayed alert message can include BBU status information and prompt the user to initiate a controlled shutdown of the operating system 10. In addition, or instead, the power management application can be configured to broadcast such an alert message over a computer network to which the computer 10 is attached. Upon receiving such an alert message, a remote user can access the computer 10 and review the status of the battery backup unit 14. If necessary, the remote user can initiate a controlled shutdown of the operating system (or perform some other action). After shutting down the operating system, the BIOS 44 instructs the battery backup unit 14 (for example, by using the BBU_ENABLE line of the BBU-to-SMBus interface) to cease supplying power to the power supply unit 12 and to power off the computer 10. Thus, the power management application, operating system, and BIOS 44 interact with the battery backup unit 14 and with each other in order to provide an integrated battery backup system for the computer 10.

In addition to detecting interrupts generated by the battery backup unit 14, the BIOS 44 in such an embodiment is configured to turn the battery backup unit 14 on after the BIOS 44 completes its power on self test. Also, the BIOS 44 can be configured to not allow the boot process to continue past the power on self test if the BIOS 44 determines that the computer 10 is not running on AC power from the AC power outlet 18.

A number of embodiments of the invention have been described. Nevertheless, it will be understood that various modifications may be made without departing from the spirit and scope of the invention. For example, elements described as being implemented in hardware can also be implemented in software and/or a combination of hardware and software. Likewise, elements described as being implemented in software can also be implemented in hardware and/or a combination of hardware and software. Accordingly, other embodiments are within the scope of the following claims.

What is claimed is:

1. A battery backup unit comprising:
   a power supply unit interface to connect the battery backup unit to a power supply unit;

a battery pack interface to connect the battery backup unit to a battery pack;

a charge circuit, connected to the power supply unit interface and the battery pack interface, to convert an input high DC voltage signal from the power supply unit to a charging signal that is output on the battery pack interface; and a discharge circuit, connected to the power supply unit interface and the battery pack interface, to convert a battery signal from the battery pack to an output high DC voltage signal that is output on the power supply unit interface.

2. The battery backup unit of claim 1, further comprising a comparator, connected to the power supply unit interface, to determine if the input high DC voltage signal is below a reference voltage.

3. The battery backup unit of claim 2, further comprising a controller connected to the charge circuit, the discharge circuit, and the comparator, to cause the discharge circuit to convert the battery signal to the output high DC voltage signal if the input high DC voltage signal is below the reference voltage.

4. The battery backup unit of claim 3, further comprising a motherboard interface to connect the battery backup unit to a motherboard.

5. The battery backup unit of claim 4, wherein the motherboard interface includes a plurality of terminals to connect the battery backup unit to a system management bus interface included on the motherboard, the plurality of terminals including:

a data terminal to connect the battery backup unit to a data line of the system management bus interface;

a clock terminal to connect the battery backup unit to a clock line of the system management bus interface;

a ground terminal to connect the battery backup unit to a ground line of the system management bus interface;

a configurable terminal to connect the battery backup unit to configurable line of the system management bus interface.

6. The battery backup unit of claim 5, wherein the configurable line of the system management bus interface is an interrupt line to allow the battery backup unit to assert an interrupt on the motherboard.

7. The battery backup unit of claim 5, wherein the configurable line of the system management bus interface is an system management bus alert line, wherein the system management bus alert line is asserted to allow the controller to cause the discharge circuit to convert the battery signal to the output high DC voltage signal.

8. The battery backup unit of claim 5, wherein plurality of terminals of the motherboard interface include:

a battery backup enable terminal to connect the battery backup unit to a battery backup enable line of the system management interface, wherein the battery backup enable line is asserted to allow the controller to cause the discharge circuit to convert the battery signal to the output high DC voltage signal.

9. The battery backup unit of claim 4, wherein the motherboard interface includes a plurality of terminals to connect the battery backup unit to a programmed input output interface included on the motherboard, the plurality of terminals including:

a battery backup active terminal to connect the battery backup unit to a battery backup active line of the programmed input output interface, wherein the battery backup active line is asserted to enable the battery backup unit to supply backup power to the power supply unit;

a ground terminal to connect the battery backup unit to a ground line of the programmed input output interface; and an ac-dc line good terminal to connect the battery backup unit to an ac-dc line good line of the programmed input output interface on the motherboard, wherein the ac-dc line good line is asserted by the battery backup unit to indicate to the motherboard that the battery backup unit is supplying power to the power supply unit interface.

10. The battery backup unit of claim 4, wherein the controller includes instructions, tangibly stored in memory, operable to cause the controller to:

notify the motherboard when a state of the battery pack changes.

11. The battery backup unit of claim 4, wherein the controller includes instructions, tangibly stored in memory, operable to cause the controller to:

update battery information stored in the battery pack when a state of the battery pack changes.

12. The battery backup unit of claim 4, wherein the controller includes instructions, tangibly stored in memory, operable to cause the controller to:

retrieve battery information stored in the battery pack; and send the retrieved battery information to the motherboard.

13. The battery backup unit of claim 4, wherein the controller includes instructions, tangibly stored in memory, operable to cause the controller to:

notify the motherboard when the input high DC voltage signal is below the reference voltage.

14. A computer comprising:

a motherboard;

a power supply unit to supply a motherboard power signal to the motherboard, including an AC power interface to connect the power supply unit to an AC power outlet;

a battery pack including a battery;

a battery backup unit including:

a charge circuit, connected to the power supply unit and the battery pack, to convert an input high DC voltage signal from the power supply unit to a charging signal that is output to the battery pack; and a discharge circuit, connected to the power supply unit and the battery pack, to convert a battery signal from the battery pack to an output high DC voltage signal that is output to the power supply unit.

15. The computer of claim 14, wherein the power supply unit includes a backflow inhibitor to inhibit power supplied by the discharge circuit from flowing to the AC power interface.

16. The computer of claim 14, wherein the battery pack includes memory to store information about the battery.

17. The computer of claim 14, further comprising a comparator, connected to the power supply unit, to determine if the input high DC voltage signal is below a reference voltage.

18. The computer of claim 17, further comprising a controller connected to the charge circuit, the discharge circuit, and the comparator, to cause the discharge circuit to convert the battery signal to the output high DC voltage signal if the input high DC voltage signal is below the reference voltage.

19. The computer of claim 18, wherein the controller includes instructions, tangibly stored in memory, operable to cause the controller to:

notify the motherboard when a state of the battery pack changes.

20. The computer of claim 18, wherein the controller includes instructions, tangibly stored in memory, operable to cause the controller to:
update battery information stored in the battery pack when a state of the battery pack changes.

21. The computer of claim 18, wherein the controller includes instructions, tangibly stored in memory, operable to cause the controller to:
retrieve battery information stored in the battery pack; and
send the retrieved battery information to the motherboard.

22. The computer of claim 18, wherein the controller includes instructions, tangibly stored in memory, operable to cause the controller to:
notify the motherboard when the input high DC voltage signal is below the reference voltage.

23. A method of supplying backup power to a power supply unit of a computer comprising:
charging a battery using a first high DC voltage signal produced by a power supply unit;
discharging the battery to produce a second high DC voltage signal if the first high DC voltage signal drops below a reference voltage; and
supplying the second high DC voltage signal to the power supply unit.

24. The method of claim 23, further comprising notifying a motherboard included in the computer when a change in a power-related condition occurs.

25. The method of claim 24, further comprising updating information memory associated with the battery when the change in the power-related condition occurs.

26. The method of claim 24, further comprising notifying the motherboard when the second high DC voltage signal is being supplied to the power supply unit.

27. The method of claim 23, further comprising ceasing discharging the battery when instructed by a motherboard included in the computer.

* * * * *